US012452013B2

United States Patent
Chen et al.

(10) Patent No.: US 12,452,013 B2
(45) Date of Patent: Oct. 21, 2025

(54) UPLINK TRANSMISSION CONTROL METHOD AND APPARATUS, AND DEVICE THEREOF

(71) Applicant: GUANGDONG OPPO MOBILE TELECOMMUNICATIONS CORP., LTD., Guangdong (CN)

(72) Inventors: Wenhong Chen, Guangdong (CN); Zhihua Shi, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 354 days.

(21) Appl. No.: 17/887,514

(22) Filed: Aug. 15, 2022

(65) Prior Publication Data

US 2022/0393827 A1 Dec. 8, 2022

Related U.S. Application Data

(63) Continuation of application No. PCT/CN2020/076133, filed on Feb. 21, 2020.

(51) Int. Cl.
H04L 5/00 (2006.01)
H04W 52/14 (2009.01)
H04W 72/20 (2023.01)

(52) U.S. Cl.
CPC ......... *H04L 5/0051* (2013.01); *H04W 52/146* (2013.01); *H04W 72/20* (2023.01)

(58) Field of Classification Search
CPC .... H04L 5/0051; H04W 52/146; H04W 72/20
See application file for complete search history.

(56) References Cited

U.S. PATENT DOCUMENTS

2020/0351129 A1* 11/2020 Kwak .................. H04W 72/53
2022/0104187 A1* 3/2022 Zhou ................. H04W 72/0446
(Continued)

FOREIGN PATENT DOCUMENTS

CA 3061633 A1 * 10/2019 .......... H04B 17/373
CA 3151526 A1 * 2/2021 .......... H04B 7/0404
(Continued)

OTHER PUBLICATIONS

"Search Report of of counterpart Europe application No. 20920495.7", issued on Apr. 4, 2023, p. 1-p. 10.
(Continued)

*Primary Examiner* — Saad A. Waqas
(74) *Attorney, Agent, or Firm* — Hodgson Russ LLP

(57) ABSTRACT

An uplink transmission control method, comprising: determining a control resource set (CORESET) group index corresponding to a first sounding reference signal (SRS) resource or a first SRS resource set; and determining, according to the first SRS resource or the first SRS resource set, transmission parameters of a physical uplink shared channel (PUSCH) or a physical uplink control channel (PUCCH) which corresponds to the same CORESET group index as the first SRS resource or the first SRS resource set, or determining power control parameters of the first SRS resource or the first SRS resource set according to the CORESET group index. Thus, user equipment can perform independent dispatching or power control on the PUSCH/PUCCH of each TRP or panel, so that the uplink transmission control is more flexible.

14 Claims, 4 Drawing Sheets

(56) References Cited

U.S. PATENT DOCUMENTS

2022/0201619 A1* 6/2022 Yao .................... H04W 52/146
2022/0330156 A1* 10/2022 Zhou .................... H04W 72/23

FOREIGN PATENT DOCUMENTS

| CN | 110536394 | 12/2019 | | |
|---|---|---|---|---|
| CN | 110798894 | 2/2020 | | |
| CN | 110798894 A | * | 2/2020 | ............... H04L 1/08 |

OTHER PUBLICATIONS

"International Search Report (Form PCT/ISA/210) of PCT/CN2020/076133", mailed on Nov. 11, 2020, with English translation thereof, pp. 1-4.

"Written Opinion of the International Searching Authority (Form PCT/ISA/237) of PCT/CN2020/076133", mailed on Nov. 11, 2020, with English translation thereof, pp. 1-7.

Spreadtrum Communications, "Discussion on Multi-TRP transmission," 3GPP TSG RAN WG1 #99 R1-1912562, Nov. 2019, pp. 1-10.

EPO, Communication for EP Application No. 20920495.7, May 15, 2025.

* cited by examiner

UPLINK TRANSMISSION CONTROL METHOD AND APPARATUS, AND DEVICE THEREOF

CROSS-REFERENCE TO RELATED APPLICATION

This application is a continuation of international PCT application serial no. PCT/CN2020/076133, filed on Feb. 21, 2020. The entirety of the above-mentioned patent application is hereby incorporated by reference herein and made a part of this specification.

BACKGROUND

Technology Field

The application relates to a field of communication technology, and particularly, to the technology field of uplink transmission.

Description of Related Art

In the new radio (NR) system, downlink non-coherent transmission and uplink non-coherent transmission based on multiple transmission reception points (TRPs) are introduced. In uplink non-coherent transmission, different TRPs can independently schedule the transmission of a physical uplink shared channel (PUSCH) of a same user equipment. The transmission of different PUSCHs can be configured with independent transmission parameters, such as beams, precoding matrices, and layers. The scheduled PUSCH transmission may be transmitted in the same time slot or in different time slots. If the user equipment is scheduled to transmit two PUSCHs simultaneously in the same time slot, it needs to determine how to perform the transmission according to the capabilities of the user equipment itself. If the user equipment is configured with multiple antenna panels and supports simultaneous PUSCH transmission on multiple panels, the two PUSCHs can be transmitted at the same time, and the PUSCHs transmitted on different panels are aligned with the corresponding TRPs for analog forming, so that different PUSCHs can be distinguished through the spatial domain, thereby providing uplink spectral efficiency. Meanwhile, the transmission on multiple panels can also be applied to the PUCCH. If the user equipment has only a single panel or does not support simultaneous transmission of multiple panels, the PUSCH can only be transmitted on one panel.

If the user equipment is configured with multiple panels for uplink transmission, each panel includes a set of physical antennas, and each panel has an independent radio frequency channel. The channel conditions corresponding to different panels are different, and different transmission parameters are required according to the respective channel information. To obtain these transmission parameters, the configuration of different SRS resources is required for different panels to obtain uplink channel information.

However, the conventional technology fails to configure an independent sounding reference signal (SRS) for different TRPs or panels to obtain uplink channel information, and meanwhile, the user equipment also fails to map PUSCH/PUCCH of different TRPs or panels to different SRSs and thereby fails to perform independent dispatching on each TRP or panel. On the other hand, the terminal fails to perform independent power control on each TRP or each SRS. Therefore, the flexibility of uplink transmission is greatly limited.

SUMMARY

The application provides an uplink transmission control method, an apparatus, and a device thereof with flexibility.

An uplink transmission control method, applied to user equipment, includes determining a control resource set (CORESET) group index corresponding to a first sounding reference signal (SRS) resource or a first SRS resource set; determining transmission parameters of an uplink signal which corresponds to a same CORESET group index as the first SRS resource or the first SRS resource set according to the first SRS resource or the first SRS resource set, or determining power control parameters of the first SRS resource or the first SRS resource set according to the CORESET group index.

An uplink transmission control method, applied to a network device, includes determining a control resource set (CORESET) group index corresponding to a first sounding reference signal (SRS) resource or a first SRS resource set; indicating the control resource set CORESET group index corresponding to the first SRS resource or the first SRS resource set to user equipment.

An uplink transmission control apparatus, applied to user equipment, includes an index determining module determining a control resource set (CORESET) group index corresponding to a first sounding reference signal (SRS) resource or a first sounding reference signal (SRS) resource set; a parameter determining module determining transmission parameters of a physical uplink shared channel (PUSCH) or a physical uplink control channel (PUCCH) of a same CORESET group index corresponding to the first SRS resource or the first SRS resource set according to the first SRS resource or the first SRS resource set, or determining power control parameters of the first SRS resource or the first SRS resource set according to the CORESET group index.

An uplink transmission control apparatus, applied to a network device, includes a determining module and an indicating module. The determining module is configured to determine a control resource set (CORESET) group index corresponding to a first sounding reference signal (SRS) resource or a first sounding reference signal SRS resource set. The indicating module is configured to indicate the control resource set (CORESET) group index corresponding to the first SRS resource or the first SRS resource set to user equipment.

User equipment includes a processor, a memory, and a network interface. The processor calls a program in the memory, executes any uplink transmission control method in the application, and sends an execution result through the network interface.

A network device includes a processor, a memory, and a network interface. The processor calls a program in the memory, executes any uplink transmission control method in the application, and sends an execution result through the network interface.

A chip includes a processor for calling and running a computer program from a memory, and a device equipped with the chip executes any uplink transmission control method in the application.

A computer-readable storage medium includes a program for an uplink transmission method stored on the computer-readable storage medium. When the program for the uplink transmission method is executed by a processor, any uplink transmission control method in the application is implemented.

A computer program product is stored in a non-transitory computer-readable storage medium. When the computer program is executed, any uplink transmission control method in the application is implemented.

The beneficial effects of the application are as follows. The user equipment determines the CORESET group index corresponding to the SRS resource or the SRS resource set, and determines the transmission parameters of the PUSCH or PUCCH corresponding to the same CORESET group index according to the SRS resource or the SRS resource set, or determines the power control parameters of the SRS or the SRS resource set according to the CORESET group index. Therefore, the network device can configure different CORESET group indexes for the uplink signals of different TRPs or different panels, and thereby the SRS of one TRP or panel can be used to determine the transmission parameters of the PUSCH/PUCCH of the TRP or panel, and the PUSCH/PUCCH of each TRP or panel can be independently scheduled. Optionally, the user equipment determines the power control parameters of the SRS according to the CORESET group index, so as to perform independent power control on the SRS of each TRP or each panel. Thus, the flexibility of uplink transmission control is improved.

BRIEF DESCRIPTION OF THE EMBODIMENTS

Figure 1:
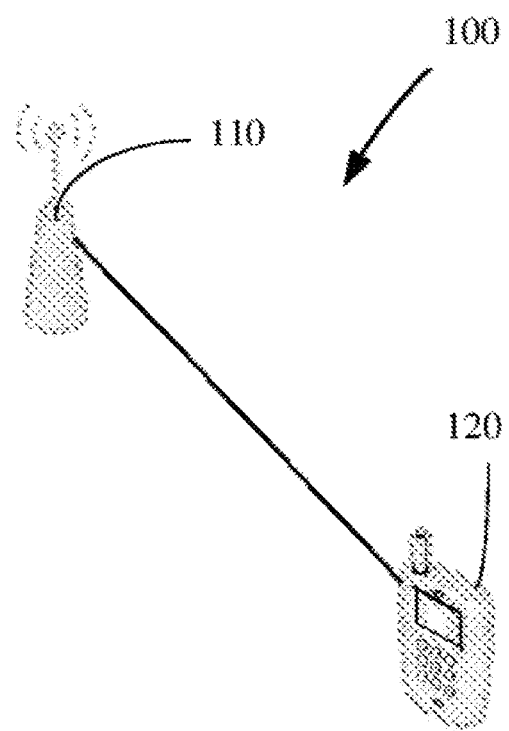
FIG. 1 is a view illustrating a system architecture according to an embodiment of the application.

In order to illustrate the objective, the technical solutions, and the advantages in the embodiments of the application more clearly, the implementations of the application with reference to the drawings are further illustrated in details in the subsequent paragraphs. It should be understood that the embodiments described herein are only intended to explain the application, but not to limit the application. However, the application may be implemented in many different forms and is not limited to the embodiments described herein. On the other hand, these embodiments aim at providing a thorough and comprehensive understanding of the present disclosure. Based on the specific embodiments in the application, all other specific embodiments obtained by those skilled in the art without creative work fall within the protection scope of the application.

The same reference numerals in different drawings are used to represent the same or similar parts in the accompanying drawings and description, unless otherwise indicated.

Additionally, the terms "system" and "network" are often used interchangeably herein. The term "and/or" herein is only an association relationship to describe the associated objects, indicating that there can be three kinds of relationships. For example, A and/or B can represent three possible scenarios in which A exists alone, both A and B exist, and B exists alone. In addition, the mark "/" in the specification generally indicates an "or" relationship between the related objects before and after the mark.

It should be understood that, in the specific embodiments of the application, "B corresponding to A" presents that B is associated with A, and B can be determined according to A. However, it should also be understood that determining B according to A does not mean that B is determined only according to A, and B may also be determined according to A and/or other information.

Referring to FIG. 1, FIG. 1 illustrates a wireless communication system 100 applied in the embodiment of the application. The wireless communication system 100 includes a network device 110 and at least one user equipment 120 located within the coverage of the network device 110. The network device 110 communicates with the user equipment 120.

Optionally, the wireless communication system 100 may include multiple network devices, and the coverage of each network device may include other user equipment, which is not limited in the embodiment of the application. Optionally, the network device 110 may provide communication coverage for a specific geographic area and may communicate with user equipment (e.g., UE) located in the coverage area. Optionally, the network device 100 may be a base transceiver station (BTS) in a GSM system or a CDMA system, may also be a NodeB (NB) in a WCDMA system, may also be an evolutional Node B (eNB or eNodeB) in an LTE system, or a wireless controller in the cloud radio access network (CRAN). Optionally, the network device may be a relay station, an access point, a vehicle-mounted apparatus, a wearable apparatus, a network-side apparatus in a 5G network, or a network device in a future evolved public land mobile network (PLMN), and the like.

The embodiments of the application can be applied to various communication systems, such as global system of mobile communication (GSM) system, code division multiple access (CDMA) system, wideband code division multiple access (WCDMA) system, general packet radio service (GPRS) system, long term evolution (LTE) system, advanced long term evolution (LTE-A) system, new radio (NR) system, evolution system of NR system, LTE-based access to unlicensed spectrum (LTE-U) system, NR-based access to unlicensed spectrum (NR-U) system, universal mobile telecommunication system (UMTS), wireless local area networks (WLAN), wireless fidelity (WiFi), next-generation communication systems, other communication systems, and the like.

The user equipment 120 may be mobile or stationary. Optionally, the user equipment 120 may refer to an access terminal, user equipment (UE), a subscriber unit, a subscriber station, a mobile station, a mobile platform, a remote station, a remote terminal, a mobile apparatus, user equipment, a terminal, a wireless communication apparatus, a user agent, or a user apparatus. The access terminal can be a cellular phone, a cordless phone, a session initiation protocol (SIP) phone, a wireless local loop (WLL) station, a personal digital assistant (PDA), a handheld apparatus with the function of wireless communication, a computing apparatus, other processing apparatuses connected to wireless modems, a vehicle-mounted apparatus, a wearable apparatus, user equipment in 5G networks or user equipment in future evolved PLMNs, and the like.

Generally, conventional communication systems support a limited number of connections and are easy to implement. However, with the development of communication technology, mobile communication systems may not only support conventional communication, but also support communication, such as apparatus to apparatus (D2D) communication, machine to machine (M2M) communication, machine type communication (MTC), vehicle to vehicle (V2V) communication, and the like. The embodiments of the application can also be applied to these communication systems.

Optionally, the communication system in the embodiments of the application may be applied to a carrier aggregation (CA) scenario, may also be applied to a dual connectivity (DC) scenario, and may also be applied to a standalone (SA) meshing scenario.

The embodiments of the application do not limit the applied spectrum. For example, the embodiments of the application may be applied to licensed spectrum and may also be applied to unlicensed spectrum.

Embodiment 1

Figure 2:
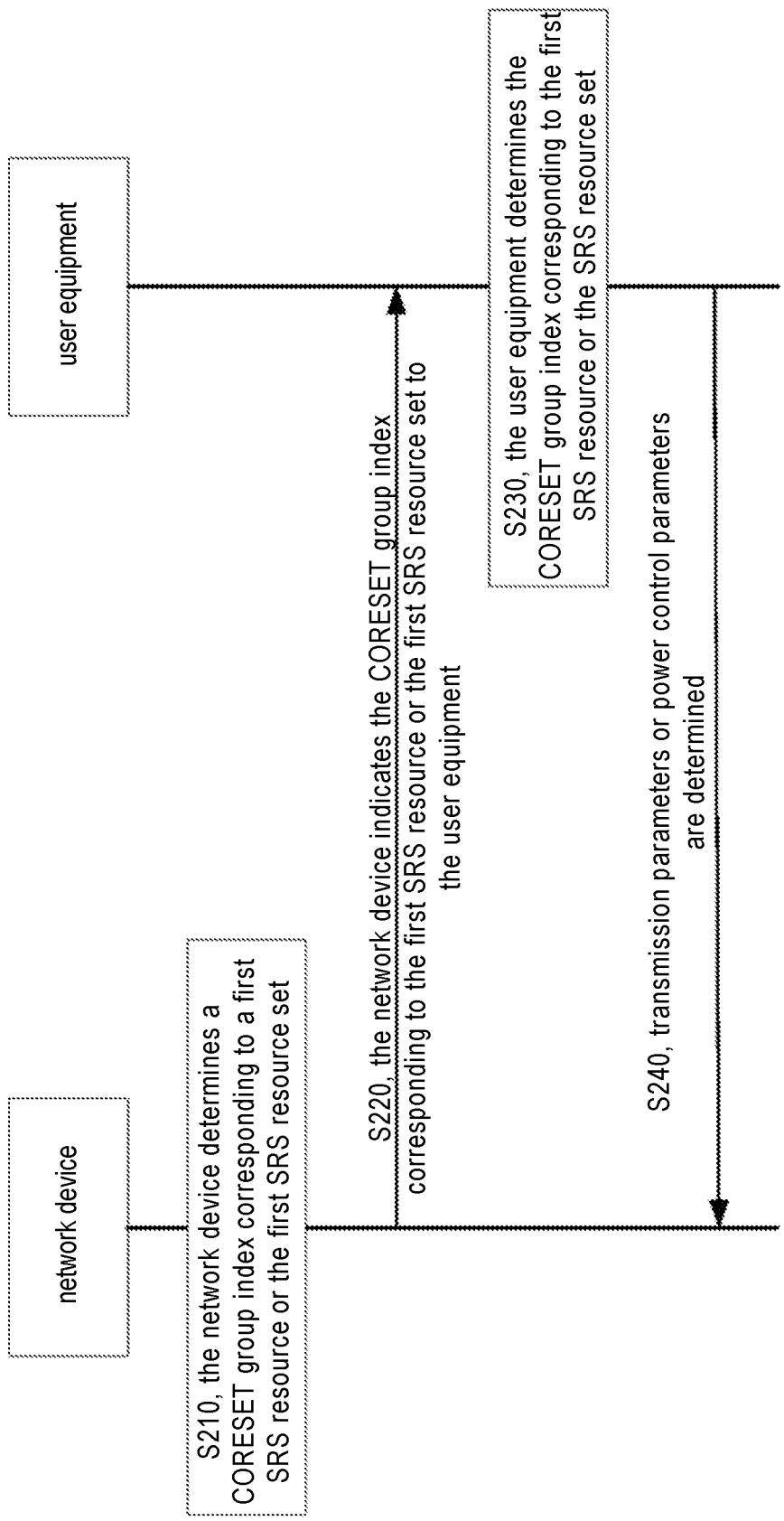
FIG. 2 is an interaction diagram illustrating an uplink transmission control method provided by Embodiment 1 of the application.

Referring to FIG. 2, FIG. 2 illustrates an uplink transmission control method provided by Embodiment 1 of the application and the method includes steps as follows.

In S210, a network device determines a control resource set (CORESET) group index corresponding to a first sounding reference signal (SRS) resource or the first sounding reference signal (SRS) resource set.

In S220, the network device indicates the control resource set (CORESET) group index corresponding to the first SRS resource or the first SRS resource set to the user equipment.

In S230, the user equipment determines the control resource set (CORESET) group index corresponding to the first SRS resource or the first sounding reference signal (SRS) resource set; that is, the user equipment determines the control resource set (CORESET) group index corresponding to the first SRS resource or the SRS resource set according to the indication of the network device.

In S240, the user equipment determines transmission parameters or power control parameters. Specifically, the user equipment determines the transmission parameters of an uplink signal which corresponds to the same CORESET group index as the first SRS resource or the first SRS resource set according to the first SRS resource or the first SRS resource set, or the power control parameters of the first SRS resource or the first SRS resource set is determined according to the CORESET group index.

Optionally, the uplink signal includes physical uplink shared channels (PUSCHs) and/or physical uplink control channels (PUCCHs).

Optionally, in S210 or S230, the step of determining the control resource set (CORESET) group index corresponding to the first sounding reference signal SRS resource or the first sounding reference signal (SRS) resource set includes any one of the determining manners as follows.

Manner 1: The CORESET group index is determined according to a configuration parameter of the first SRS resource or the first SRS resource set, and the configuration parameter includes an indication parameter for indicating the CORESET group index corresponding to the first SRS resource or the first SRS resource set; optionally, a high-layer parameter for configuring the first SRS resource set may include a parameter indicating the CORESET group index. The advantage of Manner 1 is that the existing signaling mechanism can be reused as much as possible.

For example, the parameters of the first SRS resource set may include:

SRS-ResourceSet::=SEQUENCE {
  srs-ResourceSetId SRS-ResourceSetId,
  . . .
  p0 INTEGER (−202 . . . 24) OPTIONAL,--Cond Setup
  pathlossReferenceRS CHOICE {
    ssb-Index. SSB-Index,
    csi-RS-Index NZP-CSI-RS-ResourceId
  } OPTIONAL,--Need M
  CORESETPoolIndex ENUMERATED {value1}
  OPTIONAL,
  . . .

The CORESETPoolIndex is used to indicate the CORESET group index. A value of 0 is taken when not configured, and a value of 1 is taken when configured. Therefore, if the network device does not include a parameter indicating the CORESET group index from the parameters for configuring the first SRS resource or the first SRS resource set, the user equipment may set the CORESET group index to 0.

Manner 2: If the sounding reference signal SRS transmitted on the first SRS resource or the first SRS resource set is a semi-persistent SRS, then the CORESET group index is determined according to the medium access layer control element (MAC CE) for activating semi-persistent SRS transmission; and the MAC CE includes a parameter for indicating the CORESET group index. Specifically, the MAC CE for activating semi-persistent SRS transmission may also indicate the CORESET group index as well. In Manner 2, if the network device does not include a parameter for indicating the CORESET group index in the MAC CE for activating semi-persistent SRS transmission, the user equipment may set the CORESET group index to 0. Based on Manner 2, the corresponding CORESET group index can be configured while the first SRS resource set is activated, which is highly flexible.

Manner 3: If the sounding reference signal (SRS) transmitted on the first SRS resource or the first SRS resource set is an aperiodic SRS, then the CORESET group index of the CORESET where the DCI for activating the aperiodic SRS transmission is located is used as the CORESET group index corresponding to the first SRS resource or the first SRS resource set. Specifically, the network device may configure the CORRSET group index of each CORESET in advance through high-layer signaling. Optionally, if the CORESET where the DCI for activating the aperiodic SRS transmission is located is not configured with a CORESET group index, the user equipment may set the CORESET group index to 0.

For example, the user equipment detects a DCI in the CORESET whose CORESET group index is 0, the SRS activation signaling in the DCI is used to activate K SRS resource sets, and then the CORESET group index corresponding to the K SRS resource sets is CORESETPoolIndex=0.

Manner 4: The CORESET group index corresponding to the first SRS resource or the first SRS resource set is determined according to spatial relation information or a transmission configuration indicator (TCI) state of a second SRS resource in the first SRS resource or the first SRS resource set.

Optionally, the second SRS resource is the SRS resource earliest transmitted in the first SRS resource set; the second SRS resource is the SRS resource with the lowest SRS resource identification (ID) in the first SRS resource set; or the second SRS resource is any SRS resource in the first SRS resource set.

Optionally, the CORESET group index corresponding to the first SRS resource is determined according to the spatial relation information or the TCI state of the first SRS resource. Specifically, the spatial relation information or the TCI state is used to determine the transmission beam used on the first SRS resource, and the transmission beams used by different transmission points (TRPs) or panels are different, so the CORESET group index and the transmission beams can be indicated correlatedly. The user equipment can determine the CORESET group index according to the indication information of the transmission beams, thereby reducing the signaling overhead of indicating the CORESET group index. For example, if the transmission beams configured by two SRS resources are the same, that is, their spatial relation information or TCI states are the same, then their corresponding CORESET group indexes are the same as well.

Optionally, the CORESET group index corresponding to the first SRS resource set is determined according to the spatial relation information or the TCI state of the second SRS resource in the first SRS resource set. Specifically, one of the following implementations may be included.

The second SRS resource is the SRS resource earliest transmitted in the first SRS resource set, or the SRS resource with the lowest SRS resource identification (ID) in the first SRS resource set, or any SRS resource in the first SRS resource set.

The spatial relation information or TCI states of different SRS resources in the first SRS resource set correspond to the same CORESET group index.

Specifically, different SRS resources in the first SRS resource set may use different spatial relation information or different TCI states, but the spatial relation information or TCI states correspond to the same CORESET group index. For example, the same CORESET group index is configured in the spatial relation information or TCI states. According to this method, the CORESET group indexes determined by the user equipment according to the spatial relation information or TCI states of different SRS resources in the first SRS resource set are the same. The advantage is that one SRS resource set can be used for SRS transmission of one panel or TRP, the same TRP or panel (corresponding to the same SRS resource set) corresponds to the same CORESET group index, and different panels correspond to different CORESET group indexes, which can implement independent SRS resource scheduling for each TRP or panel. In this case, the second SRS resource may be any SRS resource in the first SRS resource set.

Optionally, in Manner 4, the user equipment may determine the CORESET group index corresponding to the first SRS resource or the first SRS resource set in the following two ways.

The configuration parameter of the spatial relation information or the TCI state includes the CORESET group index. For example, the configuration parameter may be used to configure RRC signaling of each spatial relation information or TCI state or may be used to activate MAC signaling of the spatial relation information or the TCI state.

Optionally, a correspondence relationship exists between the spatial relation information and the CORESET group index or between the TCI state and the CORESET group index; the correspondence relationship can be pre-configured. In this case, the user equipment determines the CORESET group index according to the correspondence relationship and the spatial relation information or the TCI state. Specifically, the user equipment may be notified of the correspondence relationship in advance through RRC signaling. In one embodiment, the network device may notify the user equipment of the correspondence relationship between the spatial relation informationID and the CORESETPoolIndex, or the correspondence relationship between the TCI-StateID and the CORESETPoolIndex is notified.

Optionally, if the first SRS resource or the second SRS resource in the first SRS resource set is not configured with spatial relation information or a TCI state, or the spatial relation information or TCI state of the first SRS resource or the second SRS resource in the first SRS resource set is not configured with a corresponding CORESET group index, the user equipment may set the CORESET group index to 0.

Manner 5: The CORESET group index corresponding to the first SRS resource or the first SRS resource set is determined according to the closed-loop power control adjustment state used by the first SRS resource or the first SRS resource set.

Optionally, if the SRS closed-loop power control adjustment state transmitted on the first SRS resource or the first SRS resource set is the same as the closed-loop power control adjustment state of the PUSCH, then the CORESET group index of the CORESET where the DCI scheduling the PUSCH is located is scheduled to be used as the CORESET group index corresponding to the first SRS resource or the first SRS resource set. Specifically, if the SRS closed-loop power control adjustment state transmitted on the first SRS resource or the first SRS resource set is the same as the closed-loop power control adjustment state of the PUSCH, for example, the index of the closed-loop power control adjustment state is 0 (l=0), or the index is 1 (l=1), then the user equipment uses the CORESET group index of the CORESET where the first DCI is located to serve as the CORESET group index corresponding to the first SRS resource or the first SRS resource set. The first DCI is used to schedule the PUSCH that uses the closed-loop power control adjustment state of the latest transmission, or the first DCI may also be a DCI used to schedule other PUSCHs using the closed-loop power control adjustment state.

Optionally, if the SRS closed-loop power control adjustment state transmitted on the first SRS resource or the first SRS resource set is different from the closed-loop power control adjustment state of the PUSCH, then different CORESET group indexes corresponding to the first SRS resources or the first SRS resource sets using different closed-loop power control adjustment state indexes are used. For example, the network device can configure the closed-loop power control adjustment state used by SRS to be different from the closed-loop power control adjustment state of PUSCH, for example, the index of the closed-loop power control adjustment state is index 2 (l=2) or index 3 (l=3), then the SRS resource sets using index 2 and index 3 can correspond to different CORESET group indexes, for example, index 2 corresponds to CORESET group index 0 (CORESETPoolIndex=0), and index 3 corresponds to CORESET group index 1 (CORESETPoolIndex=1).

Manner 6: The corresponding CORESET group index is determined according to an SRS resource ID of the first SRS resource or an SRS resource set ID of the first SRS resource set.

Optionally, the user equipment and the network device may agree on the SRS resource ID or the correspondence relationship between the SRS resource set ID and the CORESET group index. For example, an even ID value corresponds to CORESET group index 0, and an odd ID value corresponds to CORESET group index 1.

Optionally, the network device may configure the SRS resource ID or the correspondence relationship between the SRS resource set ID and the CORESET group index through high-layer signaling, and thereby the user equipment can determine the corresponding CORESET group index according to the SRS resource ID or the SRS resource set ID.

Optionally, the manner further includes step S230A. In S230A, if the user equipment cannot derive the CORESET group index corresponding to the first SRS resource or the first SRS resource set from the configuration information of the network device, then the value of the CORESET group index is set as a preset value. For example, the preset value may be 0. For example, before the terminal receives the configuration information, the user equipment sets the value of the CORESET group index to be 0.

Optionally, multiple first SRS resource sets for obtaining downlink CSI or multiple first SRS resource sets for antenna switching correspond to the same CORESET group index. For example, if the network device is configured with multiple SRS resource sets for obtaining downlink CSI or for antenna switching, then the network device needs to configure multiple same CORESET group indexes for the multiple SRS resource sets or a CORESET group index for the multiple SRS resource sets.

Correspondingly, in S220, the network device indicates the first SRS resource or the control resource set (CORESET) group index corresponding to the first SRS resource set to the user equipment and includes steps as follows.

The CORESET group index is indicated by a configuration parameter of the first SRS resource or the first SRS resource set. The configuration parameter includes an indicating parameter for indicating the CORESET group index corresponding to the first SRS resource or the first SRS resource set.

If the sounding reference signal SRS transmitted on the first SRS resource or the first SRS resource set is a semi-persistent SRS, the medium access layer control element (MAC CE) for activating semi-persistent SRS transmission indicates the CORESET group index, and the MAC CE includes a parameter for indicating the CORESET group index.

Optionally, t the CORESET group index corresponding to the first SRS resource or the first SRS resource set is indicated according to spatial relation information or a transmission configuration indicator (TCI) state of a second SRS resource in the first SRS resource or the first SRS resource set.

Optionally, the CORESET group index corresponding to the first SRS resource or the first SRS resource set is indicated via the closed-loop power control adjustment state used by the first SRS resource or the first SRS resource set.

Optionally, the corresponding CORESET group index is indicated via the SRS resource ID of the first SRS resource or the SRS resource set ID of the first SRS resource set.

Optionally, the step S240 of determining the transmission parameters of an uplink signal which corresponds to the same CORESET group index as the first SRS resource or the first SRS resource set according to the first SRS resource or the first SRS resource set includes steps as follows.

In S241, the transmission parameters of the PUSCH are determined according to the first SRS resource or a third SRS resource; the third SRS resource is an SRS resource determined from the first SRS resource set according to the sounding reference signal resource indication (SRI) information or the transmission configuration indication (TCI) information in the DCI scheduling the PUSCH. The uplink signal parameters include PUSCH.

Optionally, the step S241 of determining the transmission parameters of the PUSCH according to the first SRS resource or the third SRS resource includes at least one of the following steps.

A precoding matrix for transmitting the PUSCH is determined based on the number of antenna ports of the first SRS resource or the third SRS resource and the precoding matrix indication (PMI) information notified by the network device. This method can be used for codebook-based PUSCH transmission. For example, the user equipment determines the codebook for the PUSCH transmission according to the number of antenna ports of the first SRS resource or the third SRS resource, and then the target codeword is determined from the codebook to serve as the precoding matrix of the PUSCH according to the PMI included in the DCI scheduling the PUSCH.

A precoding matrix for transmitting the SRS on the first SRS resource or the third SRS resource is used as the precoding matrix for transmitting the PUSCH. This method can be used for non-codebook-based PUSCH transmission.

The transmission beam for transmitting the SRS on the first SRS resource or the third SRS resource is used as the transmission beam for transmitting the PUSCH.

The total number of antenna ports of the first SRS resource or the third SRS resource, or the number of SRS resources included in the first SRS resource or the third SRS resource is used as the number of antenna ports for transmitting the PUSCH. This method can be used for non-codebook based PUSCH transmission.

The antenna ports for transmitting the first SRS resource or the third SRS resource are used as the antenna ports for transmitting the PUSCH.

An antenna panel for sending the SRS on the first SRS resource or the third SRS resource is used as an antenna panel for transmitting the PUSCH.

Optionally, the step S240 of determining the transmission parameters of an uplink signal which corresponds to the same CORESET group index as the first SRS resource or the first SRS resource set according to the first SRS resource or the first SRS resource set includes steps as follows.

The SRS resource in the first SRS resource or the first SRS resource set is used as a reference source signal in the spatial relation information of the PUSCH or the reference source signal in the TCI state of the PUSCH, and the transmission beam of the PUSCH is determined according to the reference source signal.

Optionally, the SRS resource in the first SRS resource or the first SRS resource set is used as a reference source signal in the spatial relation information of the PUCCH or the reference source signal in the TCI state of the PUCCH, and the transmission beam of the PUCCH is determined according to the reference source signal. Meanwhile, the SRS resource in the first SRS resource set may be any SRS resource in the first SRS resource set. The network device may configure the SRS resource in the first SRS resource set to the user equipment to serve as a reference source signal of the PUSCH or the PUCCH.

Specifically, when the reference source signal in the spatial relation information of the PUSCH, the reference source signal in the TCI state of the PUSCH, the reference source signal in the spatial relation information of the PUCCH, or the reference source signal in the TCI state of the PUCCH is an SRS resource, the SRS resource corresponds to the same CORESET group index as the PUSCH or PUCCH. That is, the network device cannot configure the SRS resource corresponding to one CORESET group index to serve as the reference source signal of the PUSCH or PUCCH corresponding to another CORESET group index. This ensures that the PUSCH or PUCCH transmission of each TRP or panel can be performed based on the SRS of the same TRP or panel.

Figure 3:
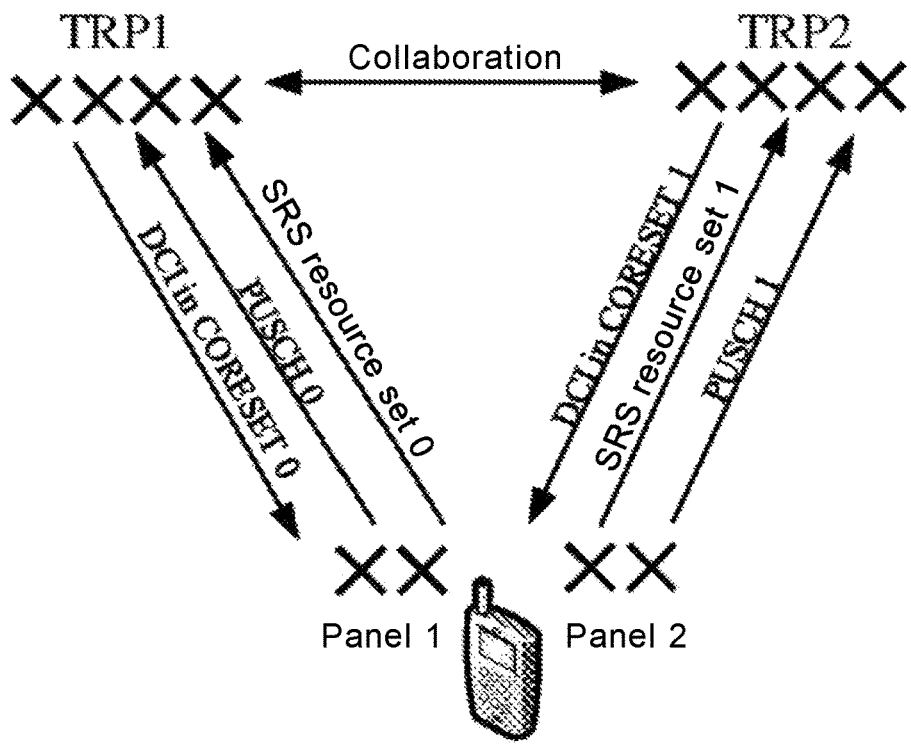
FIG. 3 is a schematic view illustrating the scheduling of PUSCH and SRS resource sets through DCI in the same CORESET.

Referring to FIG. 3, optionally, the CORESET group index corresponding to the PUSCH or PUCCH is the CORESET group index of the CORESET where the PDCCH carrying the DCI scheduling the PUSCH or PUCCH is located, or the CORESET group index configured for the PUSCH or PUCCH for the network device through high-layer signaling. Optionally, the DCI for scheduling the PUCCH may be the DCI for scheduling the PDSCH corresponding to the HARQ-ACK carried on the PUCCH, or the DCI for activating the reporting of the CSI carried on the PUCCH. As shown in FIG. 3, the SRS resource set and PUSCH transmission on the same TRP or panel can be scheduled by configuring the CORESET with the same CORESET group index.

Optionally, the step S240 of determining of the power control parameters of the first SRS resource or the first SRS resource set according to the CORESET group index may be implemented in one of the following ways.

The user equipment determines the closed-loop power control adjustment state index of the first SRS resource according to the CORESET group index corresponding to the first SRS resource; further, the terminal may determine the closed-loop power control adjustment state used for the closed-loop power control of the first SRS resource according to the closed-loop power control adjustment state index, so as to determine the transmit power of the first SRS resource. For example, when the CORESET group index corresponding to the first SRS resource is 0, the closed-loop power control adjustment state index of the first SRS resource is 2 (1=2); when the CORESET group index corresponding to the first SRS resource is 1, the closed-loop power control adjustment state index of the first SRS resource is 3 (1=3).

Figure 4:
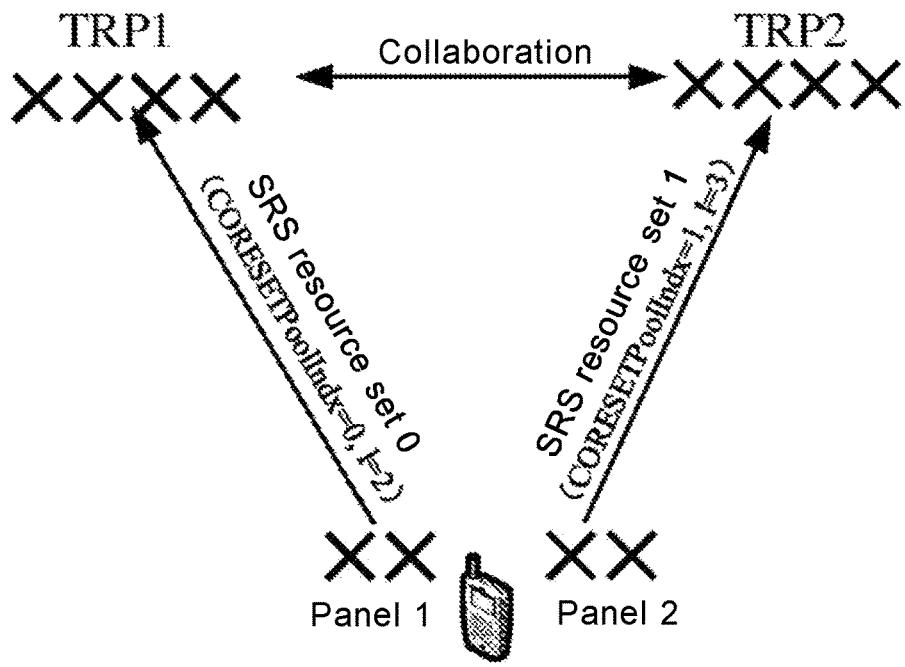
FIG. 4 is a schematic view illustrating SRS resource sets using different CORESET group indexes and closed-loop power control adjustment states.

As shown in FIG. 4, the user equipment determines the closed-loop power control adjustment state index of the first SRS resource set according to the CORESET group index corresponding to the first SRS resource set; further, the terminal may determine a closed-loop power control adjustment state for closed-loop power control of the first SRS resource set according to the closed-loop power control adjustment state index, thereby determining the transmit power of the first SRS resource set.

The user equipment determines the closed-loop power control adjustment state of the first SRS resource according to the transmit power control (TPC) command indicated by the downlink control information (DCI) carried by the PDCCH in the target CORESET; the CORESET group index of the target CORESET is the same as the CORESET group index corresponding to the first SRS resource.

The user terminal determines the closed-loop power control adjustment state of the first SRS resource set according to the TPC command indicated by the DCI carried by the PDCCH in the target CORESET, the CORESET group index of the target CORESET is the same as the CORESET group index corresponding to the first SRS resource set. This method can ensure that the TPC commands of each TRP or panel are only used for the SRS of the TRP or panel, thereby supporting the independent closed-loop power control of each TRP or panel.

Specifically, the user equipment detects DCI in the first CORESET, the CORESET group index of the first CORESET is the first CORESET group index, the DCI carries TPC commands exclusive for SRS, and then the terminal uses the detected TPC command in the DCI to adjust the closed-loop power control adjustment state of the first SRS resource or the first SRS resource set corresponding to the first CORESET group index, thereby determining the transmit power of the first SRS resource or the first SRS resource set.

Optionally, the CORESET group index corresponding to the PUSCH or the PUCCH is the CORESET group index of the CORESET where the PDCCH that carries the downlink control information (DCI) scheduling the PUSCH or the PUCCH is located; optionally, the CORESET group index corresponding to the PUSCH or the PUCCH is the CORESET group index configured by the network device for the PUSCH or the PUCCH through high-layer signaling.

Optionally, the transmission parameters include at least one of the precoding matrix, the number of antenna ports, a transmission beam, a power control parameter, and a transmission antenna panel.

Optionally, the first SRS resources or the first SRS resource sets corresponding to different CORESET group indexes support transmission on the same orthogonal frequency division multiplexing (OFDM) symbol. Meanwhile, if different CORESET group indexes correspond to different antenna panels, the SRS transmitted on the SRS resources and the SRS resource sets corresponding to different CORESET group indexes can be simultaneously transmitted on different antenna panels. The embodiment can be used for SRS only for a certain purpose, or for SRS for all purposes. Optionally, when the SRS resource or SRS resource set is used for beam management, the SRS resource or SRS resource set corresponding to the same CORESET group index cannot be transmitted simultaneously on the same OFDM, but can only be transmitted on different OFDM symbols.

Embodiment 1 of the application provides an uplink transmission control method, and the user equipment determines the CORESET group index corresponding to the SRS resource or the SRS resource set. The transmission parameters of the PUSCH or PUCCH corresponding to the same CORESET group index are determined according to the SRS resource or the SRS resource set, or the power control parameters of the SRS or SRS resource set is determined according to the CORESET group index. Based on this method, the network device can configure different CORESET group indexes for the uplink signals of different TRPs or different panels, so that the SRS of one TRP or panel can be used to determine the transmission parameters of the PUSCH/PUCCH of the TRP or panel, and the PUSCH/PUCCH of each TRP or panel can be independently scheduled. Optionally, the user equipment may also determine the power control parameters of the SRS according to the CORESET group index, and thus independent power control is performed on the SRS of each TRP or each panel. Therefore, the flexibility of uplink transmission control is improved.

Embodiment 2

Figure 5:
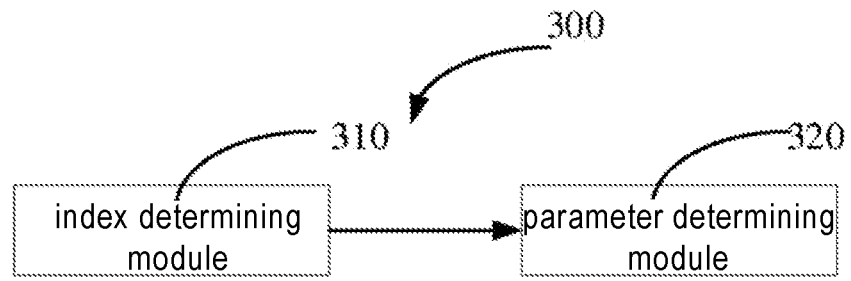
FIG. 5 is a block diagram illustrating an apparatus of uplink transmission control according to Embodiment 2 of the application.

Referring to FIG. 5, an uplink transmission control apparatus 300 provided in Embodiment 2 of the application is applied to user equipment, and the uplink transmission control apparatus 300 includes the following.

An index determining module 310 determines the control resource set (CORESET) group index corresponding to the first sounding reference signal (SRS) resource or the first sounding reference signal (SRS) resource set.

A parameter determining module 320 determines the transmission parameters of the physical uplink shared channel (PUSCH) or the physical uplink control channel (PUCCH) of the same CORESET group index corresponding to the first SRS resource or the first SRS resource set according to the first SRS resource or the first SRS resource set, or determines the power control parameters of the first SRS resource or the first SRS resource set according to the CORESET group index.

Optionally, the index determining module 310 is configured to process any one of the following.

The CORESET group index is determined by a configuration parameter of the first SRS resource or the first SRS resource set. The configuration parameter includes an indicating parameter for indicating the CORESET group index corresponding to the first SRS resource or the first SRS resource set.

If the sounding reference signal SRS transmitted on the first SRS resource or the first SRS resource set is a semi-persistent SRS, the medium access layer control element (MAC CE) for activating semi-persistent SRS transmission determines the CORESET group index, and the MAC CE includes a parameter for indicating the CORESET group index.

Optionally, if the sounding reference signal (SRS) transmitted on the first SRS resource or the first SRS resource set is an aperiodic SRS, then the CORESET group index of the CORESET where the DCI for activating the aperiodic SRS transmission is located is used as the CORESET group index corresponding to the first SRS resource or the first SRS resource set.

Optionally, the CORESET group index corresponding to the first SRS resource or the first SRS resource set is determined according to spatial relation information or a transmission configuration indicator (TCI) state of a second SRS resource in the first SRS resource or the first SRS resource set.

Optionally, the CORESET group index corresponding to the first SRS resource or the first SRS resource set is determined according to the closed-loop power control adjustment state used by the first SRS resource or the first SRS resource set.

Optionally, the corresponding CORESET group index is determined according to the SRS resource ID of the first SRS resource or the SRS resource set ID of the first SRS resource set.

Optionally, the second SRS resource is the SRS resource earliest transmitted in the first SRS resource set; the second SRS resource is the SRS resource with the lowest SRS resource identification (ID) in the first SRS resource set; or the second SRS resource is any SRS resource in the first SRS resource set.

Optionally, the configuration parameter of the spatial relation information or the TCI state includes the CORESET group index.

Optionally, a correspondence relationship exists between the spatial relation information and the CORESET group index or between the TCI state and the CORESET group index.

Optionally, if the CORESET group index corresponding to the first SRS resource or the first SRS resource set is determined according to the closed-loop power control adjustment state used by the first SRS resource or the first SRS resource set, then the following is performed.

The index determining module 310 is specifically configured to schedule the CORESET group index of the CORESET where the DCI scheduling the PUSCH is located to be used as the CORESET group index corresponding to the first SRS resource or the first SRS resource set if the closed-loop power control adjustment state of the SRS transmitted on the first SRS resource or the first SRS resource set is the same as the closed-loop power control adjustment state of the PUSCH.

Optionally, if the CORESET group index corresponding to the first SRS resource or the first SRS resource set is determined according to the closed-loop power control adjustment state used by the first SRS resource or the first SRS resource set, then the following is performed.

The index determining module is specifically configured to use different CORESET group indexes corresponding to the first SRS resources or the first SRS resource sets of different closed-loop power control adjustment state indexes if the closed-loop power control adjustment state of the SRS transmitted on the first SRS resource or the first SRS resource set is different from the closed-loop power control adjustment state of the physical uplink shared channel (PUSCH).

Optionally, the index determining module is further specifically configured to set the value of the CORESET group index to be a preset value, such as 0 if the user equipment cannot derive the CORESET group index corresponding to the first SRS resource or the first SRS resource set from the configuration information of the network device.

Optionally, multiple first SRS resource sets for obtaining downlink CSI, or multiple first SRS resource sets for antenna switching correspond to the same CORESET group index.

Optionally, the parameter determining module 320 is specifically configured to determine the transmission parameters of the PUSCH according to the first SRS resource or the third SRS resource; the third SRS resource is an SRS resource determined from the first SRS resource set according to the sounding reference signal resource indication SRI information or the transmission configuration indication (TCI) information in the DCI scheduling the PUSCH.

Optionally, the parameter determining module 320 is specifically configured to process at least one of the following.

The precoding matrix for transmitting the PUSCH is determined based on the number of antenna ports of the first SRS resource or the third SRS resource and the precoding matrix indication PMI information notified by the network device.

Optionally, the precoding matrix for transmitting the SRS on the first SRS resource or the third SRS resource is used as the precoding matrix for transmitting the PUSCH.

Optionally, the transmission beam for transmitting the SRS on the first SRS resource or the third SRS resource is used as the transmission beam for transmitting the PUSCH.

Optionally, the total number of antenna ports of the first SRS resource or the third SRS resource, or the number of SRS resources included in the first SRS resource or the third SRS resource is used as the number of antenna ports for transmitting the PUSCH.

Optionally, the antenna ports for transmitting the first SRS resource or the third SRS resource are used as the antenna ports for transmitting the PUSCH.

Optionally, the antenna panel for sending the SRS on the first SRS resource or the third SRS resource is used as the antenna panel for transmitting the PUSCH.

Optionally, the parameter determining module 320 is specifically configured to use the SRS resource in the first SRS resource or the first SRS resource set as a reference source signal in the spatial relation information of the PUSCH or the reference source signal in the TCI state of the PUSCH, and the transmission beam of the PUSCH is determined according to the reference source signal. Optionally, meanwhile, the SRS resource in the first SRS resource set may be any SRS resource in the first SRS resource set. The network device may configure the SRS resource in the first SRS resource set to the user equipment to serve as a reference source signal of the PUSCH or the PUCCH.

Optionally, the parameter determining module 320 is specifically configured to use the SRS resource in the first SRS resource or the first SRS resource set as a reference source signal in the spatial relation information of the PUCCH or the reference source signal in the TCI state of the PUCCH, and the transmission beam of the PUCCH is determined according to the reference source signal. Optionally, meanwhile, the SRS resource in the first SRS resource set may be any SRS resource in the first SRS resource set. The network device may configure the SRS resource in the first SRS resource set to the user equipment to serve as a reference source signal of the PUSCH or the PUCCH.

Optionally, the fourth SRS resource is configured to the user equipment as a reference source signal of the PUSCH or the PUCCH.

Optionally, if the power control parameters of the first SRS resource or the first SRS resource set are determined according to the CORESET group index, then the following is performed.

The parameter determining module 320 is specifically configured to determine the closed-loop power control adjustment state index of the first SRS resource or the first SRS resource set according to the CORESET group index.

Optionally, the closed-loop power control adjustment state of the first SRS resource or the first SRS resource set is determined according to the transmit power control TPC command indicated by the downlink control information DCI in the target CORESET; the CORESET group index of the target CORESET is the same as the CORESET group index corresponding to the first SRS resource or the first SRS resource set.

Optionally, the CORESET group index corresponding to the PUSCH or the PUCCH is the CORESET group index of the CORESET where the PDCCH that carries the downlink control information DCI scheduling the PUSCH or the PUCCH is located; or the CORESET group index corresponding to the PUSCH or the PUCCH is the CORESET group index configured by the network device for the PUSCH or the PUCCH through high-layer signaling.

Optionally, the transmission parameters include at least one of the precoding matrix, the number of antenna ports, a transmission beam, a power control parameter, and a transmission antenna panel.

Optionally, the first SRS resources or the first SRS resource sets corresponding to different CORESET group indexes support transmission on the same OFDM symbol.

For the details of the second embodiment, refer to the same or corresponding parts in the first embodiment, which may not be repeated herein.

Embodiment 3

Figure 6:
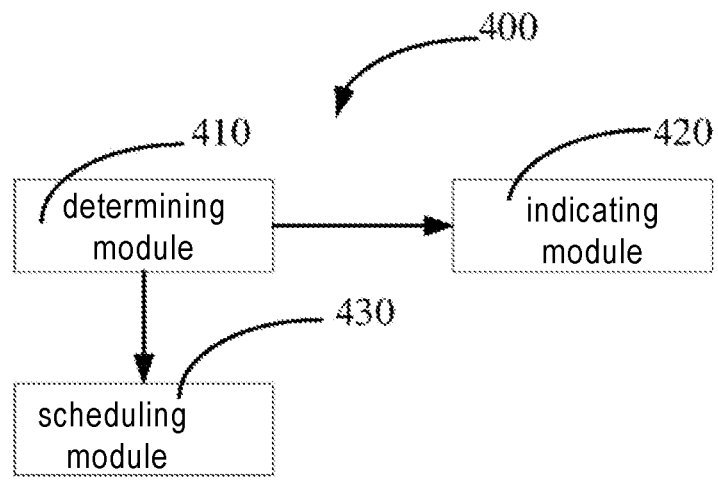
FIG. 6 is a block diagram illustrating an apparatus of uplink transmission control according to Embodiment 3 of the application.

Referring to FIG. 6, an uplink transmission control apparatus 400 provided by Embodiment 3 of the application is applied to network device, and the uplink transmission control apparatus 400 includes the following.

A determining module 410 is configured to determine a control resource set (CORESET) group index corresponding to the first sounding reference signal (SRS) resource or the first sounding reference signal SRS resource set.

An indicating module 420 is configured to indicate the control resource set (CORESET) group index corresponding to the first SRS resource or the first SRS resource set to the user equipment.

Optionally, the determining module 410 is specifically configured to determine the CORESET group index corresponding to the first SRS resource or the first SRS resource set according to the transmission reception point (TRP) for receiving the first SRS resource or the first SRS resource set; or the CORESET group index corresponding to the first SRS resource or the first SRS resource set is determined according to the TRP for activating the first SRS resource or the first SRS resource set.

Optionally, the indicating module 420 is specifically configured to process any one of the following.

The CORESET group index is indicated by a configuration parameter of the first SRS resource or the first SRS resource set, where the configuration parameter includes an indicating parameter for indicating the CORESET group index corresponding to the first SRS resource or the first SRS resource set.

If the sounding reference signal (SRS) transmitted on the first SRS resource or the first SRS resource set is a semi-persistent SRS, the medium access layer control element (MAC CE) for activating semi-persistent SRS transmission indicates the CORESET group index, and the MAC CE includes a parameter for indicating the CORESET group index.

Optionally, the CORESET group index corresponding to the first SRS resource or the first SRS resource set is indicated according to spatial relation information or a transmission configuration indicator (TCI) state of a second SRS resource in the first SRS resource or the first SRS resource set.

Optionally, the CORESET group index corresponding to the first SRS resource or the first SRS resource set is indicated via the closed-loop power control adjustment state used by the first SRS resource or the first SRS resource set.

Optionally, the corresponding CORESET group index is indicated via the SRS resource ID of the first SRS resource or the SRS resource set ID of the first SRS resource set.

Optionally, the second SRS resource is the SRS resource earliest transmitted in the first SRS resource set; the second SRS resource is the SRS resource with the lowest SRS resource identification (ID) in the first SRS resource set; or the second SRS resource is any SRS resource in the first SRS resource set.

Optionally, the configuration parameter of the spatial relation information or the TCI state includes the CORESET group index. Optionally, a correspondence relationship exists between the spatial relation information and the CORESET group index or between the TCI state and the CORESET group index.

Optionally, the determining module 410 is specifically configured to determine the same CORESET group index for multiple first SRS resource sets for obtaining downlink CSI or multiple first SRS resource sets for antenna switching.

Optionally, a scheduling module 430 is configured to schedule the first SRS resources or the first SRS resource sets corresponding to different CORESET group indexes to be transmitted on the same orthogonal frequency division multiplexing (OFDM) symbol.

Optionally, the transmission parameters include at least one of the precoding matrix, the number of antenna ports, a transmission beam, a power control parameter, and a transmission antenna panel.

For details of the third embodiment, refer to the same or corresponding parts in the first embodiment, which may not be repeated herein.

Embodiment 4

Figure 7:
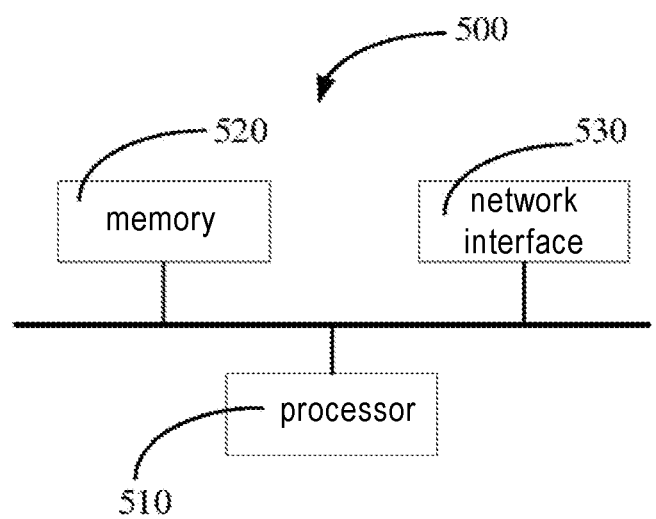
FIG. 7 is a schematic view illustrating the structure of an uplink transmission control apparatus according to Embodiment 4 of the application.

Referring to FIG. 7, FIG. 7 is a schematic view illustrating the structure of an uplink transmission control apparatus 500 according to Embodiment 4 of the application. The uplink transmission control apparatus 500 includes a processor 510, a memory 520, and a network interface 530. The processor 510 calls the program in the memory 520 to execute the corresponding process in the uplink transmission control method provided in the first embodiment implemented by the network device, or execute the corresponding process in the uplink transmission control method provided in the first embodiment implemented by the user equipment, and send the execution result through the network interface 530.

The processor 510 may be an independent component or a collective term for multiple processing components. For example, it may be a CPU, an ASIC, or one or more integrated circuits configured to implement the method, such as at least one microprocessor DSP, or at least one programmable gate FPGA, and the like.

The application is described with reference to flowcharts and/or block diagrams of a method, a device (a system), and a computer program product according to the embodiments of the application. It shall be understood that each procedure and/or block in the flowcharts and/or block diagrams and a combination of procedures and/or blocks in the flowcharts and/or block diagrams can be implemented by computer program instructions. These computer program instructions may be provided to the processor of a general purpose computer, special purpose computer, embedded processor, chip or other programmable data processing apparatus to produce a machine, so that with the instructions executed by a processor of a computer or other programmable data processing apparatuses, an apparatus with specified functions for implementing a procedure or procedures of the flowcharts and/or a block or blocks of the block diagrams is produced. The program may be stored in a computer-readable storage medium, and the storage medium may include a read only memory (ROM), a random access memory (RAM), a magnetic disk or an optical disk, and the like.

The foregoing embodiments illustrate but do not limit the invention, and those skilled in the art can design multiple alternative embodiments within the scope of the claims. Those skilled in the art shall be aware that appropriate adjustments, modifications, and the like may be made to specific embodiments without departing from the scope of the invention as defined by the appended claims. Therefore, any modifications and changes made in accordance with the spirit and principles of the invention are within the scope of the invention as defined by the appended claims.

What is claimed is:

1. An uplink transmission control method, applied to user equipment, wherein the method comprises:
    determining, according to an indication from a network device, a control resource set (CORESET) group index corresponding to a first sounding reference signal (SRS) resource set;
    determining transmission parameters of an uplink signal which corresponds to a same CORESET group index as the first SRS resource set according to the first SRS resource set;
    wherein determining the CORESET group index corresponding to the first SRS resource set comprises:
    determining the corresponding CORESET group index according to an SRS resource set identification of the first SRS resource set;
    wherein the uplink signal comprises a physical uplink shared channel (PUSCH);
    a CORESET group index corresponding to the PUSCH is a CORESET group index of a CORESET where the PDCCH that carries the downlink control information (DCI) scheduling the PUSCH is located,
    wherein determining the transmission parameters of the uplink signal which corresponds to the same CORESET group index as the first SRS resource set according to the first SRS resource set comprises:
    determining transmission parameters of the PUSCH according to a third SRS resource; wherein the third SRS resource is an SRS resource determined from the first SRS resource set according to the sounding reference signal resource indication (SRI) information in DCI scheduling the PUSCH,
    wherein determining the transmission parameters of the PUSCH according to the third SRS resource comprises:
    determining a precoding matrix for transmitting the PUSCH based on a number of antenna ports of the third SRS resource and precoding matrix indication (PMI) information notified by a network device.

2. The method according to claim 1, wherein the method further comprises:
    setting a value of the CORESET group index to be a preset value if the user equipment cannot derive the CORESET group index corresponding to the first SRS resource set from configuration information of a network device.

3. The method according to claim 1, wherein a plurality of the first SRS resource sets for obtaining downlink channel state information (CSI) correspond to a same CORESET group index, or a plurality of the first SRS resource sets for antenna switching correspond to a same CORESET group index.

4. The method according to claim 1, wherein the transmission parameters comprise at least one of a precoding matrix, a number of antenna ports, a transmission beam, a power control parameter, and a transmission antenna panel.

5. An uplink transmission control method, applied to a network device, wherein the method comprises:
    determining a control resource set (CORESET) group index corresponding to a first sounding reference signal (SRS) resource or a first SRS resource set;
    indicating the control resource set (CORESET) group index corresponding to the first SRS resource set to user equipment, comprising:
    indicating the corresponding CORESET group index via an SRS resource set identification of the first SRS resource set, wherein the CORESET group index corresponding to the first SRS resource set allows the user equipment to determine transmission parameters of an uplink signal which corresponds to a same CORESET group index as the first SRS resource set according to the first SRS resource set;
    wherein the uplink signal comprises a physical uplink shared channel (PUSCH);
    a CORESET group index corresponding to the PUSCH is a CORESET group index of a CORESET where the PDCCH that carries the downlink control information, DCI, scheduling the PUSCH is located, wherein the first SRS resource set allows the user equipment to determine transmission parameters of the PUSCH according to a third SRS resource, which is an SRS resource determined from the first SRS resource set according to the sounding reference signal resource indication (SRI) information in DCI scheduling the PUSCH, wherein the user equipment is allowed to perform:

determining a precoding matrix for transmitting the PUSCH based on a number of antenna ports of the third SRS resource and precoding matrix indication (PMI) information notified by a network device.

6. The method according to claim 5, wherein a plurality of the first SRS resource sets for obtaining downlink channel state information (CSI) correspond to a same CORESET group index, or a plurality of the first SRS resource sets for antenna switching correspond to a same CORESET group index.

7. The method according to claim 5, wherein the transmission parameters comprise at least one of a precoding matrix, a number of antenna ports, a transmission beam, a power control parameter, and a transmission antenna panel.

8. An uplink transmission control apparatus, applied to user equipment, wherein the apparatus comprises a processor and a memory storing computer program instructions, and the processor is configured to execute the computer program instructions to cause the apparatus to perform:

determining, according to an indication from a network device, a control resource set CORESET group index corresponding to a first sounding reference signal (SRS) resource set;

determining transmission parameters of an uplink signal of a same CORESET group index corresponding to the first SRS resource set according to the first SRS resource set;

wherein the processor is specifically configured to execute the computer program instructions to cause the apparatus to perform:

determining the corresponding CORESET group index according to an SRS resource set identification of the first SRS resource set;

wherein the uplink signal comprises a physical uplink shared channel (PUSCH);

a CORESET group index corresponding to the PUSCH is a CORESET group index of a CORESET where the PDCCH that carries the downlink control information (DCI) scheduling the PUSCH is located, wherein the processor is specifically configured to execute the computer program instructions to cause the apparatus to perform:

determining transmission parameters of the PUSCH according to a third SRS resource; wherein the third SRS resource is an SRS resource determined from the first SRS resource set according to the sounding reference signal resource indication (SRI) information in DCI scheduling the PUSCH, wherein the processor is specifically configured to execute the computer program instructions to cause the apparatus to perform:

determining a precoding matrix for transmitting the PUSCH based on a number of antenna ports of the third SRS resource and precoding matrix indication (PMI) information notified by a network device.

9. The uplink transmission control apparatus according to claim 8, wherein the processor is specifically configured to execute the computer program instructions to cause the apparatus to:

set a value of the CORESET group index to be a preset value if the user equipment cannot derive the CORESET group index corresponding to the first SRS resource set from configuration information of a network device.

10. The uplink transmission control apparatus according to claim 8, wherein a plurality of the first SRS resource sets for obtaining downlink CSI, or a plurality of the first SRS resource sets for antenna switching correspond to a same CORESET group index.

11. The uplink transmission control apparatus according to claim 8, wherein the transmission parameters comprise at least one of a precoding matrix, a number of the antenna ports, a transmission beam, a power control parameter, and a transmission antenna panel.

12. An uplink transmission control apparatus, applied to a network device, wherein the apparatus comprises a processor and a memory storing computer program instructions, and the processor is configured to execute the computer program instructions to cause the apparatus to perform:

determining a control resource set (CORESET) group index corresponding to a first sounding reference signal (SRS) resource or a first SRS resource set;

indicating the control resource set (CORESET) group index corresponding to the first SRS resource set to user equipment, comprising:

indicating the corresponding CORESET group index via an SRS resource set identification of the first SRS resource set, wherein the CORESET group index corresponding to the first SRS resource set allows the user equipment to determine transmission parameters of an uplink signal which corresponds to a same CORESET group index as the first SRS resource set according to the first SRS resource set;

wherein the uplink signal comprises a physical uplink shared channel (PUSCH);

a CORESET group index corresponding to the PUSCH is a CORESET group index of a CORESET where the PDCCH that carries the downlink control information, DCI, scheduling the PUSCH is located, wherein the first SRS resource set allows the user equipment to determine transmission parameters of the PUSCH according to a third SRS resource, which is an SRS resource determined from the first SRS resource set according to the sounding reference signal resource indication (SRI) information in DCI scheduling the PUSCH, wherein the user equipment is allowed to perform:

determining a precoding matrix for transmitting the PUSCH based on a number of antenna ports of the third SRS resource and precoding matrix indication (PMI) information notified by a network device.

13. The uplink transmission control apparatus according to claim 12, wherein a plurality of the first SRS resource sets for obtaining downlink channel state information (CSI) correspond to a same CORESET group index, or a plurality of the first SRS resource sets for antenna switching correspond to a same CORESET group index.

14. The uplink transmission control apparatus according to claim 12, wherein the transmission parameters comprise at least one of a precoding matrix, a number of antenna ports, a transmission beam, a power control parameter, and a transmission antenna panel.

* * * * *